Patented June 6, 1933

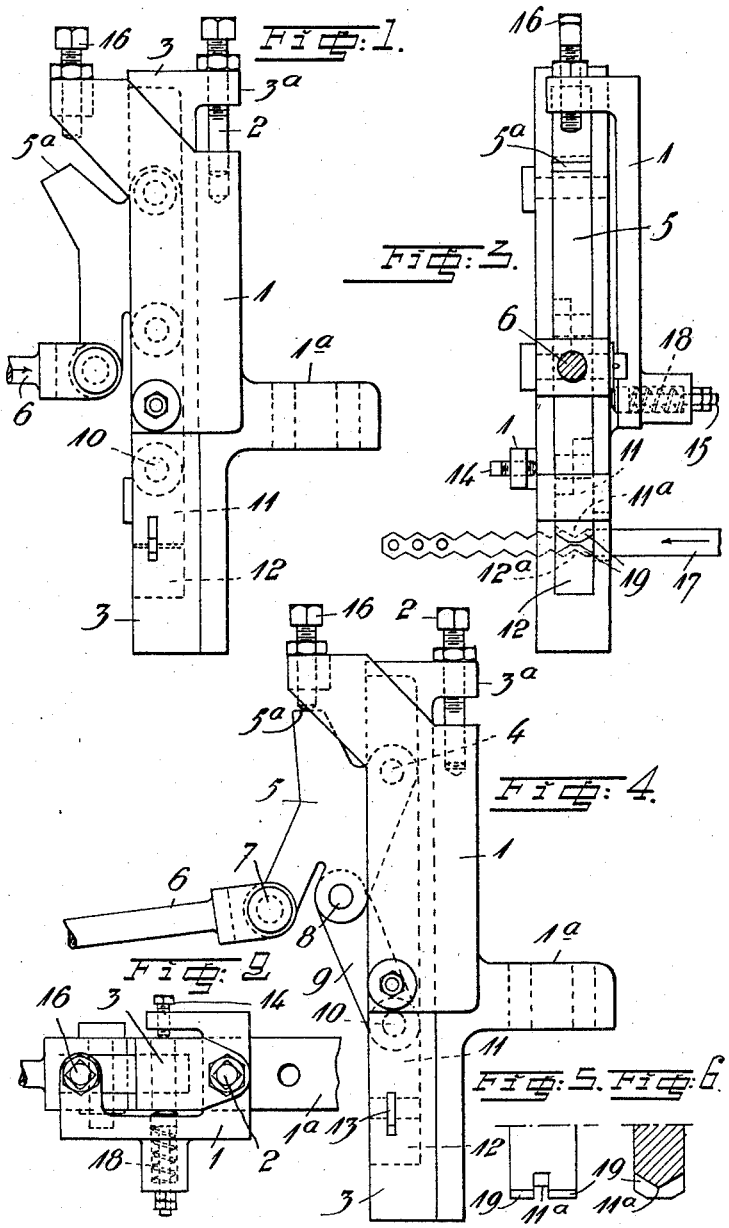

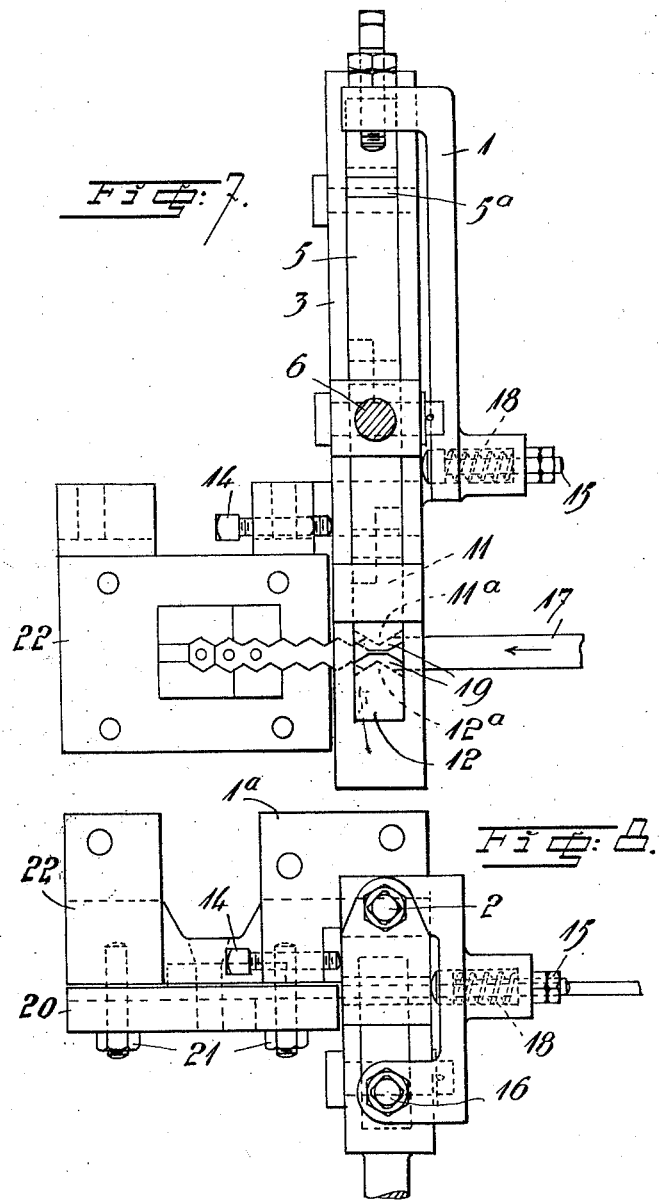

1,912,971

UNITED STATES PATENT OFFICE

JONAS GOTTFRID CLAESON, OF HALLSTAHAMMAR, SWEDEN

BAR NOTCHING APPARATUS, ESPECIALLY FOR MANUFACTURING HEXAGONAL NUTS

Application filed May 10, 1932, Serial No. 610,450, and in Sweden May 11, 1931.

In the manufacture of hexagonal nuts from flat iron bars in a cold condition there has hitherto been the disadvantage that a considerable waste of material was unavoidable. In order to remove this disadvantage, a previous proposal has been made to press or squeeze notches in the edges of the flat iron bars in special machines, using cooperating tools with a plurality of pointed teeth which were simultaneously pressed against the opposite edges of the flat iron bars, thereby producing the above mentioned notches. However, when this method was used, the material was compressed between and under the teeth of the tools and became as a result of the compression so hard that the nut blanks could not be cut off without enormous wear of the cutting tools used, and it was at the same time exceedingly difficult to achieve even distribution of the notches in the joints between each pressing operation because the material between the teeth of the pressing tool cannot be displaced lengthwise along the bar, while at the ends of the tools it can flow freely in the lengthwise direction.

In order to avoid this difficulty, another proposal was made later, according to which rollers were used which worked together in pairs and were provided with suitable teeth on their periphery. These teeth produced the notches when the rollers rotated.

In this way, an improvement was achieved in so far that the material could flow out in the lengthwise direction of the bars during the process of pressing the notches without causing the above mentioned objectionable hardness or difficulties in the even distribution of the teeth.

A considerable inconvenience remains, however, even in the case of the last-mentioned proposal, namely, that the process of making the notches has to be carried out in a special machine, after which the flat iron bar which has been notched has to be removed to and undergo further working in the nut-cutting machine.

The present invention has for its object a contrivance or special apparatus for the production of the above mentioned notches which makes it possible to perform this operation in the same machine that does the piercing and the cutting off of the nut blanks. The notches are obtained through the action of only one pair of cooperating teeth so that the material can flow out towards that end of the bar which is free and opposite to the end being held stationary in the nut cutting machines. In this manner, the advantages of the above-mentioned rolling method are obtained thus avoiding the disadvantages of using tools with a plurality of teeth and at the same time it is possible to carry out as well the notching as the piercing and cutting-off of the nut blanks in a single machine. The apparatus is such, that as one end of the metal bar is held fast in the nut-cutting machine, and the material can only flow out towards the opposite end of the same, the member carrying the notching tools can partake in the movement thus caused.

The invention is intended in the first place for use in a nut-cutting machine. The said member carrying the notching tools may either be mounted independently on a special frame in the nut cutting machine or permanently fixed to the said machine. The invention is not confined to the manufacture of nuts. It can be used in all cases where it is required to press or squeeze notches in bars or rings of metal and the like, for example, in the manufacture of spikes for rails, etc.

One form of construction according to this invention, intended to be attached to a nut-cutting machine, is shown in the attached drawings. Fig. 1 is a side-view showing the positions occupied by the different parts when the pressing is carried out. Fig. 2 shows the apparatus as seen from above and Fig. 3 is a front view. Fig. 4 is a corresponding view to Fig. 1 with the parts in the position they occupy while the bar is being fed forwards and thus before pressing. Fig. 5 is an end view and Fig. 6 a vertical section through the upper tool which produces the notches. Both these figures are on a larger scale. Figs. 7 and 8 show the notching device attached to a nut cutting machine. Fig. 7 is a side view and Fig. 8 a plan view.

The frame 1 is so constructed that it can be attached by means of the projecting part 1a to a fixed support in a nut-cutting machine. To the frame 1 is movably attached a slide 3 which is hung on said frame by means of a pivot 2 which goes through a flange 3a on the slide 3. The slide 3 is pivotally connected by means of a pivot 4 with an arm 5 which may suitably be of the form shown in Fig. 4. At the opposite end, the arm 5 is pivotally connected by means of a pivot 8 to an arm 9 which, in its turn, is pivotally connected by means of a pivot 10 to the upper tool 11, which can be moved in the lengthwise direction of the slide 3. The lower tool 12 is fixed to the lower end of the slide 3 and moves accordingly with the same. Just opposite the two tools 11 and 12 there is an opening 13 through which the metal bar 17 is introduced and, by means of suitable (not shown) means, is caused to move intermittently in the direction of the arrow in Fig. 3.

An arm on the link 5 is pivotally connected by means of a bolt 7 to a rod 6 which is caused by means, not shown in the drawings, to move backwards and forwards.

The slide 3 is so arranged that it can be moved to a certain extent sidewise, i. e., in the lengthways direction of the bar 17 so as to allow the flowing out of the material during the pressing of the notches. This flowing out can, since the notched end of the bar 17 is fixed in the nut-cutting machine, only take place in one direction, i. e., against the direction of movement of the bar 17. The sideways movement of the slide 3 (see Fig. 3) is made possible in the form of construction shown by giving it the necessary play in the frame, the movement in question taking place against the action of a pin 15 which is actuated by a spring 18. The pin 15, which bears against one side of the slide and holds the latter normally pressed against a stop-screw 14 in the frame 1 which is placed on the opposite side (Figs. 2 and 3). In this manner, the lower end of the slide with the notching tools makes a sidewise movement with the metal flowing out when the notches are pressed, the whole slide then performing an oscillating movement with the pivot 2 as the centre of oscillation. This sidewise movement may, however, take place otherwise than as shown. For example, the slide 3 or some other member carrying the tools can be arranged so as to perform a parallel sidewise movement when the elongation of the material caused by pressing the notches takes place.

At the upper end of the frame there is a set-screw 16 against which the surface 5a of the link 5 lies when the parts take up the position shown in Fig. 4.

Fig. 7 shows the apparatus attached to the piercing and nut cutting machine, only the holder 22 of the cutting tools being visible in this figure. In Fig. 8 the plate 20 attached by bolts 21 to the holder serves as a guide for the piercing tool. The plate 20 and the bolts 21 are removed from Fig. 7.

The apparatus works as follows:—

In the initial position, the parts are in the positions shown in Fig. 4. The metal bar 17 is introduced through the opening 13 and is fed forwards intermittently, so that it is thus held still for certain periods of time. During these periods while it is held still, the rod 6 is moved in the direction shown by the arrow in Fig. 1, whereby the links 5 and 9 are caused to act as a toggle lever, the link 5 pushing the pivot 4 and the slide 3 connected with it upwards. The lower tool 12, which is fixed to the slide, is thereby caused to move upwards at the same time. Simultaneously, the link 9 causes the pivot 10 and the upper tool 11 which is movably attached to it to be pressed downwards. The tools 11 and 12 are thus pressed against the upper and lower edges respectively of the bar 17 and the teeth 11a and 12a of the tools respectively then produce impressions or notches in the metal bar which are opposite to each other as shown in Fig. 3. The metal then flows out to the right in Figs. 3 and 7 and the slide 3 partakes in this movement. In order to prevent the material from flowing out in the cross direction of the bar while it is being pressed, the tools are provided with side pieces 19, see Figs. 5 and 6.

The pivot 2 is introduced into a hole in the frame 1 which is so arranged that the slide can both move up and down (see the dotted end of the pivot in Fig. 1) and oscillate sideways about it. The slide may also be movable on the frame in other ways.

When impressing the notches, one end of the metal bar (the left-hand one in Fig. 3) is held fast in the nut-cutting tool (see Fig. 7) and the material can therefore flow out only towards the opposite end. When this occurs, the above-mentioned oscillation of the slide 3 against the effect of the spring-operated pin 15 takes place (thus to the right in Figs. 3 and 7). When the tools 11 and 12 have moved apart again after pressing the notches (Fig. 4) the spring 18 moves the slide 3 against the stop-screw 14.

On returning the parts from the pressing to the starting position the surface 5a of the link 5 comes into contact with the screw 16 whereby the tools are withdrawn from the bar 17 and the latter can again be fed forward.

It is evident that the details shown and described may be varied in many ways without departing from the scope of the invention. Thus, the present invention does not exclude the use of rollers with teeth in the periphery working in conjunction with each other, subject to the condition that the rollers are carried by moveable bearings so that they can partake in the displacement in one direction caused by the elongation of the material. In the same manner, it is possible, in order to increase the pressing force, to arrange for independent link motion devices for both the upper and the lower tool, in which case the latter would thus not need to be fixed in the slide.

According to the present invention the metal bar is pressed in a cold condition.

I claim:

1. Apparatus for impressing notches in metal bars one end of which is held fast during the impressing operation, comprising a frame, a device suspended in said frame, tools in said device for impressing notches in opposite sides of the metal bar, means for moving said tools towards and from one another, means for permitting said device to move sideways so as to follow the material flowing out in the lengthwise direction of the bar when the notches are impressed, and means for automatically returning the same to the normal position when the tools are removed from the bar.

2. Apparatus for impressing notches in non-heated metal bars, one end of which is held fast during the pressing, comprising a frame, a device suspended in said frame, tools in said device for impressing notches in opposite sides of said metal bar located between them, the lower tool being formed in said device while the other one is movable in the same, a toggle lever contrivance for moving said tools towards and from one another, said device being at its upper end suspended in the frame so that its lower end with the tools can move sideways so as to follow the material flowing out in the lengthwise direction of the bar when the tools are moved to make the impressions, and spring actuated means for automatically returning said device to its normal position when the tools are removed from the bar.

3. Machine for manufacturing hexagonal nuts from non-heated metal bars, comprising in combination means for piercing and cutting off nut blanks from the metal bar, means for making notches in said bar previous to the piercing and cutting off the nut blanks, said means for making notches consisting of a frame located in said machine, a device suspended in said frame, tools in said device for impressing the notches in opposite sides of the bar, means for moving said tools towards and from the opposite edges of the bar, means for intermittently feeding the bar forwards towards the nut cutting tools between the pressing and cutting off operations, means for permitting said device with the tools to move sideways and follow the flowing out of the material in the longitudinal direction towards the non-notched end of the bar when the impressions are made, and means for removing said device with the tools to its normal position.

4. Machine according to claim 3, characterized by the fact that the device containing the tools consists of a slide which is suspended in the frame by means of a pivot passed through the upper end of the slide and into a hole in the frame, said hole being so adapted that the slide can both move in its lengthwise direction and oscillate sideways about the pivot.

In testimony whereof I have hereunto affixed my signature.

JONAS GOTTFRID CLAËSON.